United States Patent
Sui et al.

(10) Patent No.: US 12,227,196 B2
(45) Date of Patent: Feb. 18, 2025

(54) VEHICLE CONTROL AND TASK PROCESSING METHOD AND APPARATUS, COMPUTING DEVICE AND SYSTEM

(71) Applicant: Beijing Tusen Zhitu Technology Co., Ltd., Beijing (CN)

(72) Inventors: Qingyu Sui, Beijing (CN); Jianan Hao, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 273 days.

(21) Appl. No.: 17/650,076

(22) Filed: Feb. 5, 2022

(65) Prior Publication Data
US 2022/0250637 A1 Aug. 11, 2022

(30) Foreign Application Priority Data
Feb. 7, 2021 (CN) .......................... 202110168861.0

(51) Int. Cl.
| | |
|---|---|
| B60W 50/08 | (2020.01) |
| G06F 8/65 | (2018.01) |
| G06F 9/445 | (2018.01) |
| G07C 5/08 | (2006.01) |

(52) U.S. Cl.
CPC ............ B60W 50/085 (2013.01); G06F 8/65 (2013.01); G06F 9/44505 (2013.01); G07C 5/0816 (2013.01); G07C 5/085 (2013.01)

(58) Field of Classification Search
None
See application file for complete search history.

(56) References Cited

U.S. PATENT DOCUMENTS

| | | | |
|---|---|---|---|
| 2003/0036876 A1 | 2/2003 | Fuller, III et al. | |
| 2010/0085215 A1* | 4/2010 | Doyle, III | G08G 1/127 455/456.1 |
| 2017/0080935 A1* | 3/2017 | Canale | B60W 40/08 |
| 2019/0205115 A1* | 7/2019 | Gomes | H04W 4/50 |

(Continued)

FOREIGN PATENT DOCUMENTS

| | | | |
|---|---|---|---|
| CN | 109862508 A | * | 6/2019 |
| CN | 110874272 A | | 3/2020 |

OTHER PUBLICATIONS

European Patent Office, Communication pursuant to Article 94(3) EPC for EP Appl. No. 22155116.1, mailed on Sep. 1, 2023, 6 pages.

(Continued)

*Primary Examiner* — Tuan C To
*Assistant Examiner* — David Ruben Pedersen
(74) *Attorney, Agent, or Firm* — Perkins Coie LLP

(57) ABSTRACT

The present application discloses a vehicle control and task processing method and apparatus, a computing device and a system. The vehicle control method comprises: acquiring a driving control task to be executed and target parameters associated with the driving control task; and executing a corresponding algorithm based on the target parameters to enable a driving control system to complete the driving control task. Through the above-mentioned technical solution, accurate vehicle parameters are acquired according to the driving control task, thereby improving the reliability of driving control.

20 Claims, 4 Drawing Sheets

(56) References Cited

U.S. PATENT DOCUMENTS

2020/0412811 A1* 12/2020 Campbell ............. H04L 65/752
2022/0024476 A1* 1/2022 Lund ..................... B60K 35/80

OTHER PUBLICATIONS

European Patent Office, Examination Report for EP 22155116.1, Mailing Date: Feb. 22, 2023, 6 pages.
European Patent Office, Extended European Search Report for EP 22155116.1, Mailing Date: Jun. 20, 2022, 10 pages.
Wikipedia: Cache (computing), Retrieved from the Internet: URL: https://en.wikipedia.org/w/index.php?title=Cache_(computing)&oldid=1003256017 [retrieved on Jun. 8, 2022], last edited on Jan. 28, 2021, 10 pages.
European Patent Office, Communication pursuant to Article 94(3) EPC for EP Appl. No. 22155116.1, mailing date: May 16, 2024, 6 pages.

* cited by examiner

VEHICLE CONTROL AND TASK PROCESSING METHOD AND APPARATUS, COMPUTING DEVICE AND SYSTEM

PRIORITY CLAIM

The present disclosure claims priority to Chinese Patent Application No. 202110168861.0, titled "VEHICLE CONTROL AND TASK PROCESSING METHOD AND APPARATUS, COMPUTING DEVICE AND SYSTEM", filed on Feb. 7, 2021, the content of which is incorporated herein by reference in its entirety.

TECHNICAL FIELD

The embodiments of the present application relate to the field of vehicle control, and in particular to a vehicle control and task processing method and apparatus, a computing device and system.

BACKGROUND

In an unmanned driving scene, driving control tasks such as positioning, detecting and tracking of a vehicle need to be realized based on accurate vehicle parameters. With the development of vehicle control technology and the increase of people's demands for various intelligent functions, more and more vehicle parameters are used, and these vehicle parameters change along with the change of vehicle hardware information and thus need to be continuously updated and maintained. How to effectively manage vehicle parameters and ensure that a vehicle-end computing device can use effectual vehicle parameters to carry out vehicle control is the problem to be urgently solved.

In the current parameter management scheme, vehicle parameters are recorded and used by a vehicle-end computing device itself, depend on manual recording or updating, and thus are inconvenient to maintain and cannot be guaranteed to be latest; in addition, the validity and the updating timeliness of theses vehicle parameters cannot be guaranteed for different driving control tasks. If correct and available vehicle parameters cannot be acquired, the driving control function of a vehicle is affected, and thus the vehicle cannot successfully depart.

SUMMARY

Embodiments of the present application provide a vehicle control and task processing method and apparatus, a computing device and a system so as to acquire accurate vehicle parameters according to a driving control task, thereby improving the reliability of driving control.

An embodiment of the present application provides a vehicle control method, which comprises: acquiring a driving control task to be executed and target parameters associated with the driving control task; and executing a corresponding algorithm based on the target parameters to enable a driving control system to complete the driving control task.

An embodiment of the present application further provides a task processing method executed in a second computing device, which comprises: receiving a target parameter request sent by a first computing device; and sending target parameters associated with a driving control task to the first computing device in response to the target parameter request sent by the first computing device so as to enable the first computing device to execute a corresponding algorithm based on the target parameters to complete the driving control task.

An embodiment of the present application further provides a vehicle control apparatus, which comprises: a parameter acquisition module, configured for acquiring a driving control task to be executed and target parameters associated with the driving control task; and an algorithm execution module, configured for executing a corresponding algorithm based on the target parameters to enable a driving control system to complete the driving control task.

An embodiment of the present application further provides a task processing apparatus residing in a second computing device, which comprises: a receiving module, configured for receiving a target parameter request sent by a first computing device; and a processing module, configured for sending target parameters associated with a driving control task to the first computing device in response to the target parameter request sent by the first computing device so as to enable the first computing device to execute a corresponding algorithm based on the target parameters to enable a driving control system to complete the driving control task.

An embodiment of the present application further provides a first computing device, which comprises: one or more processors; and a storage apparatus, used for storing one or more programs; wherein the one or more programs, when executed by the one or more processors, cause the one or more processors to implement the above-mentioned vehicle control method.

An embodiment of the present application further provides a second computing device, which comprises: one or more processors; and a storage apparatus, used for storing one or more programs; wherein the one or more programs, when executed by the one or more processors, cause the one or more processors to implement the above-mentioned task processing method.

An embodiment of the present application further provides a vehicle control system, which comprises a first computing device and a second computing device, wherein the first computing device and the second computing device are connected by a network; the second computing device is used for managing target parameters associated with a driving control task and metadata corresponding to the target parameters; the first computing device is used for acquiring the target parameters and controlling a vehicle according to the target parameters.

Embodiments of the present application provide a vehicle control and task processing method and apparatus, a computing device and a system, wherein the vehicle control method comprises: acquiring a driving control task to be executed and target parameters associated with the driving control task; and executing a corresponding algorithm based on the target parameters such that a driving control system can complete the driving control task. Through the above-mentioned technical solution, accurate vehicle parameters are acquired according to the driving control task, thereby improving the reliability of driving control.

DETAILED DESCRIPTION

Figure 1:
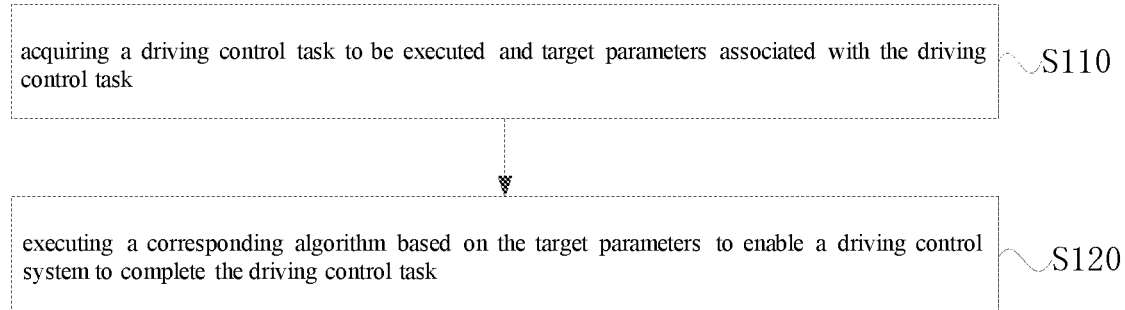
FIG. 1 is a flowchart of a vehicle control method provided in an embodiment of the present application.

The present application will be further described in detail with reference to the drawings and embodiments. It will be appreciated that the specific embodiments described herein are merely illustrative of the present application and are not to be construed as limiting the present application. In addition, the embodiments and features thereof in the present application may be combined with one another without conflict. It should be further noted that, for the convenience of description, only some, but not all, structures associated with the present application are shown in the drawings.

It should be noted that, before discussing exemplary embodiments in greater detail, some exemplary embodiments are described as processes or methods depicted as flowcharts. Although a flowchart describes steps as sequential processes, many of the steps can be implemented in parallel, concurrently, or simultaneously. In addition, the sequence of the steps can be rearranged. The processes can be terminated when operations thereof are completed, however, additional steps not included in the figure can be comprised herein. The processes can correspond to methods, functions, procedures, subroutines, subprograms, and the like.

It should be noted that the terms "first", "second", and the like in the embodiments of the present application are only used for distinguishing between different apparatuses, modules, units, or other objects, and are not used for limiting the sequence of the functions performed by these apparatuses, modules, units, or other objects, or the interdependence of these apparatuses, modules, units, or other objects.

Provided in an embodiment of the present application is a vehicle control method, of which a reliable basis is provided for a driving control system to complete a driving control task by acquiring target parameters associated with the driving control task and automatically executing a corresponding algorithm.

FIG. 1 is a flowchart of a vehicle control method provided in an embodiment of the present application. As shown in FIG. 1, the method provided in this embodiment comprises the following steps.

S110: a driving control task to be executed and target parameters associated with the driving control task are acquired.

In this embodiment, the driving control task refers to a task that needs to be completed by a vehicle in an automatic driving process, and can be controlled and executed by a driving control system used for continuously controlling the vehicle in real time. The driving control task is associated with a departure time, a driving starting point, a driving ending point, a driving scene and the like. For example, in a goods transportation task, a traveling path of a vehicle needs to be acquired, and a trailer mounted on a vehicle, a bearing capacity and the like also need to be determined; for example, in a reverse parking task, a reverse parking garage position, a reverse-parking starting point and the like need to be determined. In an example manned task, a traveling path of a vehicle needs to be acquired, and a get-off station of each passenger also needs to be determined.

The target parameters associated with the driving control task refer to various software and hardware configuration parameters needed for executing this driving control task, for example, various types of software and hardware configuration parameters affecting a control mode or a control algorithm of a driving control system. The target parameters may comprise physical parameters of different tractors and different trailers, layout and calibration information of various types of sensors on a vehicle, or software of a vehicle-end service and software allocation resources corresponding thereto. Target parameters can further comprise parameters associated with algorithm models obtained by machine learning and training, wherein these algorithm models are configured for automatically executing corresponding algorithms, such as a positioning algorithm, a perception algorithm, a decision algorithm, a control algorithm, a road condition analysis algorithm, a path planning algorithm or an obstacle avoidance algorithm, by utilizing the acquired target parameters for different driving control tasks.

In an embodiment, the target parameters may be directly read from a vehicle-end parameter packet by a vehicle on condition that the locally-stored vehicle-end parameter packet is ensured to be correct; in the case of a change in vehicle software and/or hardware information, the target parameters may also be acquired from vehicle parameters stored in a cloud according to a driving control task.

S120: a corresponding algorithm is executed based on the target parameters to enable a driving control system to complete the driving control task.

In this embodiment, the vehicle provides the acquired target parameters associated with the driving control task and an algorithm execution result (for example, at least one of road condition analysis result, a path planning result, or an obstacle avoidance instruction) for the driving control system such that the driving control system can complete the driving control task in an unmanned driving process.

In an embodiment, the driving control task comprises at least one of the following: a driving starting point, a driving ending point, a driving scene, a vehicle number or a trailer number.

The driving starting point is usually a departure position, namely a position where a vehicle is parked; the driving ending point is a destination for a traveling vehicle, for example, a designated place for goods to be transported is a driving ending point; the driving scene comprises at least one of reverse parking, long-distance driving, short-distance driving, continuous driving, intermittent driving, high-speed driving, driving in mountains, driving with goods, or manned driving, etc., with different driving scenes associated with different target parameters. For example, in the case of reverse parking, target parameters associated with a reverse parking function need to be acquired, and specifically comprise a closing instruction of some forward sensors and an opening instruction of backward cameras and radars and the like, such that a state behind a vehicle can be conveniently observed. In the case of high-speed driving, target parameters associated with a constant-speed cruise function can be acquired to automatically control the vehicle speed, thereby reducing unnecessary vehicle speed change and saving fuels, and moreover, a closing instruction of backward sensors can be acquired, and target parameters of forward sensors can be acquired as many as possible. In the case of driving in mountains with complex terrains and road conditions, target parameters associated with a panoramic image function can be acquired to acquire the configuration of all-directional sensors, or the time when each type of target parameters need to be read can be automatically judged, such that a vehicle can adapt to complex terrains and road conditions. The vehicle number is used for uniquely identifying a vehicle waiting for departure, and can comprise at least one of a license plate number, a vehicle frame number or a number uniquely configured for a vehicle in other forms; the vehicle number can be a tractor number; the trailer number is used for uniquely identifying a trailer mounted on a vehicle waiting for departure, and the target parameters required by automatic driving control can be affected due to different models, sizes or shapes of trailers.

In an embodiment, target parameters are further associated with parameter change information of a vehicle, wherein the parameter change information includes at least one of the following: vehicle model information, trailer information, a pairing relationship between the vehicle model information and the trailer information, sensor information or vehicle-end server configuration.

Specifically, if software and/or hardware information of a vehicle changes, target parameters need to be reacquired. For example, a change in a model of a vehicle waiting for departure, a replacement of a trailer of a vehicle waiting for departure, a change in a pairing relationship between the vehicle model and the trailer, the layout or calibration parameters of sensors arranged on the vehicle, and the configuration of a vehicle-end server in use, etc.

For example, for an unmanned truck or tractor, a trailer mounted thereon may be changed every day, so configuration parameters of the trailer need to be updated accordingly. A truck may have at least one trailer and at least one trailer is mounted on a tractor in a queue. Sometimes, the tractor and the first trailer are usually paired together and other trailer (such as the second or last trailer) second or last trailer changes aperiodically. The usually paired tractor and first trailer thus can be considered as a whole. By establishing a pairing relationship between the vehicle model and the trailer, corresponding configuration parameters of the trailer can also be flexibly acquired when the vehicle model changes, thereby improving the reliability of using the trailer in the driving control process.

As another example, different server configurations correspond to different server software and software resource allocations. Different types of servers have different configurations, and servers of the same type may also have different configuration schemes. The server configuration may be hardware configuration, for example, a central processing unit (CPU) and/or a graphics processing unit (GPU) configure different servers (which can also be servers of different thicknesses), and resource allocation schemes of software may also be different. According to configuration changes of vehicle-end servers, resource allocation schemes of vehicle-end servers can be flexibly acquired, thereby improving actual execution efficiency of software and avoiding mutual influence. In addition, a socket corresponding to the software of a vehicle-end service may also be different for different types of servers.

In an embodiment, target parameters comprise at least one of the following: a vehicle size, a vehicle model, hardware layout and calibration information; a trailer identifier, a trailer size, sensor information mounted on a trailer; a type, number, setting position and angle of sensors; parameters of an algorithm model bound with a driving control task; or configuration parameters of a corresponding relationship between software of a vehicle-end service and software allocation resources.

In this embodiment, the target parameters comprise at least one or more of the following:

1) Parameters bound with a vehicle, such as at least one of: a vehicle size, a vehicle model, hardware layout or calibration information, wherein a unique number can be bound with the vehicle in advance, so that the parameters bound with the vehicle can be maintained conveniently, wherein the hardware layout comprises various types of sensors arranged on the vehicle and functions of these sensors, for example, an image sensor camera 1 is a forward left-side camera, a camera 2 is a lateral right-side camera, and a lidar 1 is under a right-side reflector;

the calibration information comprises a positional relationship between these sensors and a positional relationship of these sensors relative to the vehicle, for example, the positional offset and rotation of the camera 1 relative to a center point of the vehicle (which may be set according to actual requirements, and is usually a physically stable position such as a center point of a front axle of a vehicle) can be expressed by using three-dimensional coordinates (Yaw angle/Roll angle/Pitch angle) or quaternions; the calibration information describes positions and a rotation relationship between these sensors, and information obtained from the sensors at different positions can be fused in a three-dimensional space in a driving control process according to the positions and the rotation relationship between these sensors.

2) Parameters bound with a trailer, such as a trailer identifier, a trailer size, and sensor information mounted on a trailer, wherein a unique number can be bound with the trailer in advance, so that the parameters bound with the trailer can be maintained conveniently; the trailer size comprises at least one of a size, length or wheelbase of a trailer; there are various ways to acquire a trailer number, for example, a required trailer and a number thereof before the departure of a vehicle through a vehicle travel journey management service are determined as target parameters; or a manually-designated trailer number can be used as a target parameter, or a trailer number read from an external storage device mounted on the trailer is used as a target parameter.

3) Parameters bound with sensors, such as a type, number, setting position or setting angle of sensors; for a pluggable sensor, parameters bound with the pluggable sensor can be acquired by reading sensor identifiers, or by detecting a plugging signal of the pluggable sensor, or a connection or disconnection state of the pluggable sensor relative to a vehicle.

4) Parameters of an algorithm model bound with a driving control task, such as types of algorithm models obtained by machine learning and training (e.g., a clustering algorithm, a neural network model, and a support vector machine model), model parameters (e.g., a clustering center, a network structure, labels, weights, and the number of iterations), or formats of input data and output data.

It should be noted that parameters involved in the algorithm models may belong to target parameters, but the algorithm model is generally a configuration containing a large number of parameters and occupying a large amount of storage, thereby affecting the overall file size and processing efficiency of configuration files. In this embodiment, the algorithmic models themselves may not belong to target parameters, but for different driving control tasks the algorithmic model to be selected is part of the target parameters; namely, the type of algorithmic models belongs to the target parameters.

5) Configuration parameters of a corresponding relationship between software of a vehicle-end service and software allocation resources.

A corresponding relationship between software of a server and software allocation resources also can differ for different types of servers, and the target parameters can comprise configuration parameters of a corresponding relationship between software and software allocation resources. For example, if a vehicle uses a 3U server (i.e., 3 Unit server, wherein U or Unit is a unit representing an external size of a server) one day, target parameters that are acquired comprise a software configuration on the 3U server and software allocation resources corresponding thereto. If a 7U (i.e., 7 Unit) server is used on the day, target parameters that are acquired comprise a software configuration on the 7U server and software allocation resources corresponding thereto. In addition, the target parameters may further comprise configuration parameters of a corresponding relationship between software of a vehicle-end service and a socket.

In an embodiment, an algorithm model bound with a driving control task specifically comprises algorithm models corresponding to different vehicle models and trailer types. For example, parameters such as vehicle models as well as lengths, wheelbases and weights of trailers may cause differences in a view field of cameras arranged on a vehicle, a blocked area, a counterweight of the vehicle, or physical parameters of the vehicle. Thus, a plurality of different algorithm models may be trained for different vehicle models and trailer types, or a common model may be trained.

In an embodiment, target parameters bound with a driving control task specifically comprise physical parameters corresponding to different vehicle models, for example, if a vehicle model A does not support processing of a steering wheel angle message, and a vehicle type B supports processing of a steering wheel angle message, target parameters acquired by the vehicle model A during the execution of a driving control task do not comprise a steering wheel angle message, but a steering wheel angle message can be acquired by the vehicle model B.

In an embodiment, target parameters bound with a driving control task specifically comprise algorithm models corresponding to different driving control tasks. For example, for a reverse parking task, there are a set of reverse-parking-dedicated planning and control algorithms and algorithm models corresponding thereto; for a normal driving task, the set of algorithm models does not need to be acquired.

In an embodiment, the method further comprises: selecting configuration parameters bound with the vehicle model information as target parameters according to configuration files of the vehicle-end service.

Specifically, the configuration parameters bound with the vehicle model information can be automatically selected based on configuration files of a vehicle-end server. For example, the configuration files of the vehicle-end server record a model of a vehicle waiting for departure, and when the vehicle model is determined, configurations such as a length, wheelbase and weight of a vehicle can also be determined, so that an algorithm model to which physical parameters of the vehicle model, a view field of cameras arranged on the vehicle and a counterweight of the vehicle are applied can be used as a target parameter.

In an embodiment, the method further comprises: selecting configuration parameters bound with the trailer information as target parameters according to test operation and maintenance data of a driving control task in a set time period.

Specifically, the configuration parameters bound with the trailer information can be selected by a test operation and maintenance system based on departure conditions in the set time period. For example, a trailer is selected for a current driving control task according to at least one of departure times in a set time period, whether a trailer is mounted for each departure, or which trailer is mounted. Alternatively, configuration parameters bound with trailer information are acquired so that frequent replacement of trailers can be avoided or the applicability of trailers is ensured. In a large-scale operation process, a vehicle control system can be accessed to a test operation and maintenance system to acquire information of each departure of a vehicle, and configuration parameters bound with trailer information can be automatically selected as target parameters for a driving control task.

In an embodiment, the vehicle control method is executed in a first computing device, and acquiring target parameters associated with the driving control task comprises: accessing a second computing device according to the driving control task to acquire metadata associated with the driving control task; and acquiring corresponding target parameters according to the metadata.

In this embodiment, the vehicle control method is executed in the first computing device, wherein the first computing device is, for example, a controller of a vehicle, a head unit or an electronic control unit (ECU), or a vehicle-end server. The target parameters corresponding to the driving control task are stored and maintained by the second computing device, wherein the second computing device is, for example, a cloud server, a centralized control node or a network management device. The second computing device can receive parameters input by related personnel, receive a parameter update request from the first computing device or monitor changes of software and hardware information of the vehicle, so that the latest vehicle parameters are updated and stored in time, and the first computing device can acquire corresponding target parameters according to the driving control task.

Furthermore, the first computing device, prior to acquiring the target parameters, acquires metadata from the second computing device according to the driving control task. The metadata is information for describing the attribute of target parameters, and can be used for indicating functions such as index name, storage location, update condition, or version information recording of the target parameters. The first computing device acquires metadata according to the driving control task and then acquires corresponding target parameters according to the description of the metadata. For example: for a vehicle with a trailer A mounted thereon, the first computing device acquires target parameters corresponding to the trailer A. Acquired metadata can at least comprise a unique index name used for describing the target parameters corresponding to the trailer A; for example, the index name of target parameters that may need to be acquired by a vehicle X with a trailer A mounted thereon is X-A, while the index name of target parameters that may need to be acquired by the vehicle X with a trailer B mounted thereon is X-B.

In another example, if a vehicle-end server used by a first computing device is a 3U server, target parameters that are acquired comprise a version of software on the 3U server and an index name indicating a corresponding socket; if a 7U server is used on the day, target parameters that are acquired comprise a version of software on the 7U server and an index name indicating a corresponding socket.

In an embodiment, after acquiring the target parameters associated with the driving control task, the method further comprises: storing the metadata and the corresponding target parameters as a vehicle-end parameter packet; and calling a parameter acquisition interface to read the target parameters in the vehicle-end parameter packet.

In this embodiment, by storing the metadata and the corresponding target parameters locally in the form of a vehicle-end parameter packet, for different driving control tasks, the corresponding target parameters can be read from the vehicle-end parameter packet by using a uniform parameter acquisition interface. The method is used for executing corresponding algorithms and being used by a driving control system, which simplifies storage and reading processes of target parameters, and improves the efficiency of vehicle control.

Figure 2:
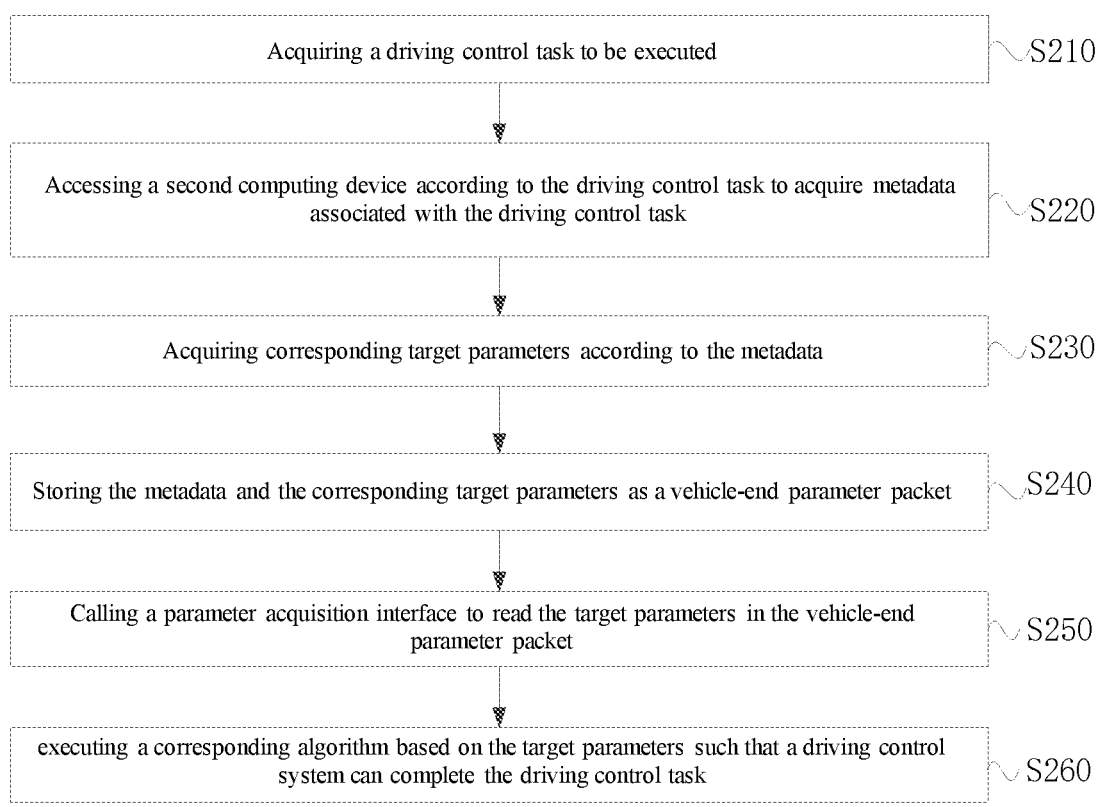
FIG. 2 is a flowchart of a vehicle control method provided in another embodiment of the present application.

FIG. 2 is a flowchart of a vehicle control method provided in another embodiment of the present application. As shown in FIG. 2, the method comprises the following.

S210: a driving control task to be executed is acquired.

S220: a second computing device is accessed according to the driving control task to acquire metadata associated with the driving control task.

In an embodiment, the metadata comprises at least one of the following:

an index of a parameter set to which the target parameters belong, for example, in the second computing device, target parameters corresponding to different driving control tasks correspond to different parameter sets, respectively, and an index of a parameter set is used for distinguishing different parameter sets, wherein a first computing device firstly acquires an index of a parameter set to which target parameters belong, and then a second computing device can acquire corresponding target parameters according to the index of the parameter set to which the target parameters belong;

a creation time and an update time of the target parameters, used for quickly judging whether the target parameters are latest or not;

historical version information of the target parameters and an index of each historical version, facilitating rapid rollback of problematic parameter versions;

a creator and an updater for the target parameters, used for quickly finding out possible contacts when the parameters have errors; or updated description information of the target parameters, used for quickly checking possible reasons when the parameters have errors, for example, an update of target parameters due to a change in software and hardware of a vehicle, or an update of target parameters due to an input by related personnel.

In this embodiment, data such as the update time, historical versions, or the updater of the target parameters are described by using the metadata, so that the metadata can be maintained, updated and expanded conveniently; the historical versions can be recovered in the case of update failure; and sources can be traced in the case of errors in parameters to quickly determine failure reasons and solutions, thereby improving the reliability of vehicle control.

S230: corresponding target parameters according to the metadata is acquired.

S240: the metadata and the corresponding target parameters are stored as a vehicle-end parameter packet.

S250: a parameter acquisition interface is called to read the target parameters in the vehicle-end parameter packet.

In this embodiment, the first computing device acquires specific target parameters from the second computing device according to the acquired metadata and stores the specific target parameters as a local vehicle-end parameter packet. The first computing device, when executing an algorithm, can directly read the target parameters from the vehicle-end parameter packet through a uniform parameter acquisition interface and execute the corresponding algorithm. Algorithm codes themselves can also be read from the vehicle-end parameter packet through the parameter acquisition interface, and these parameters may not be maintained by an algorithm itself (for example, parameters such as length and width of a vehicle), and may also be maintained by an algorithm developer via a parameter management system (for example, a unique identifier used for searching an algorithm model).

S260: a corresponding algorithm is executed based on the target parameters such that a driving control system can complete the driving control task.

In an embodiment, acquiring corresponding target parameters according to the metadata comprises: judging whether local metadata associated with the driving control task is stored at the vehicle (e.g., on a computing or storage device located in the vehicle); if yes, acquiring the target parameters corresponding to the metadata from the second computing device when the metadata is updated relative to the local metadata stored at the vehicle.

In this embodiment, if the vehicle stores the local metadata associated with the driving control task, it indicates that the target parameters associated with the driving control task have already been acquired according to the local metadata and stored as the vehicle-end parameter packet. In this case, if metadata corresponding to the current driving control task is updated relative to the stored local metadata, the target parameters are reacquired from the second computing device.

In an embodiment, acquiring corresponding target parameters according to the metadata further comprises: adopting target parameters in a vehicle-end parameter packet corresponding to the local metadata stored locally when the metadata is not updated relative to the local metadata stored at the vehicle.

In this embodiment, if the metadata corresponding to the current driving control task is consistent with the stored local metadata, the target parameters do not need to be acquired from the second computing device, and the metadata associated with the driving control task in the vehicle-end parameter packet may be directly read.

Figure 3:
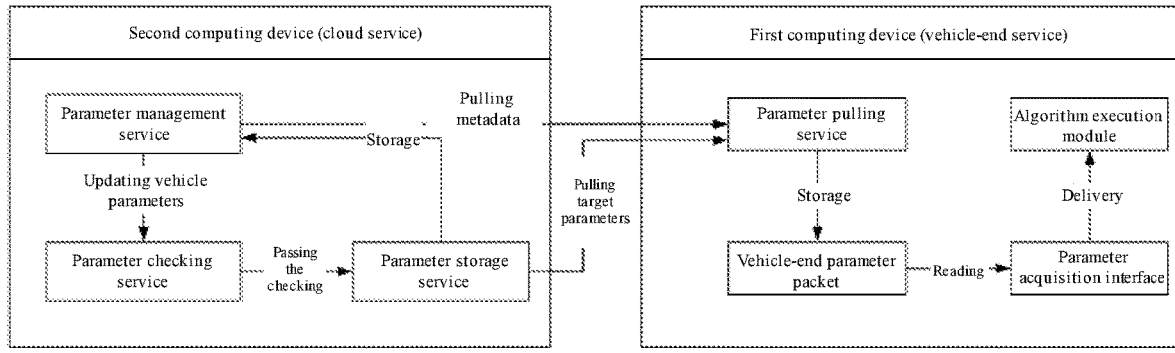
FIG. 3 is a schematic diagram of a process for acquiring target parameters provided in an embodiment of the present application.

FIG. 3 is a schematic diagram of a process for acquiring target parameters provided in an embodiment of the present application. As shown in FIG. 3, for the second computing device, a parameter management service, a parameter checking service and a parameter storage service are provided therein. Related personnel or the first computing device can initiate a parameter updating request, and the second computing device responds to the parameter update request through the parameter management service and collects and stores the latest vehicle parameters. The correctness checking of the vehicle parameters is triggered by the parameter management service, and the correctness of the vehicle parameters is checked through a running test of the parameter checking service. The vehicle parameters are submitted to the parameter storage service after being checked, and metadata of the parameters is maintained by the parameter management service.

For the first computing device, a parameter pulling service, a parameter acquisition interface and an algorithm execution module are provided therein. The parameter pulling service pulls corresponding metadata from the parameter management service according to a driving control task, and then specific target parameters are acquired from the parameter storage service according to the acquired metadata and stored as a vehicle-end parameter packet. The parameters can be read from the vehicle-end parameter packet through a uniform parameter acquisition interface when these parameters need to be used by algorithm module codes of a user. A parameter management mechanism of this embodiment can realize configurations of pluggable external components such as a dynamically-mounted trailer, and verify the correctness of parameters of an unmanned vehicle, and therefore it can ensure the availability and correctness of the parameters, with efficient switching of the configurations, it can improve the reliability of vehicle control and ensure the safety of unmanned driving.

Figure 4:
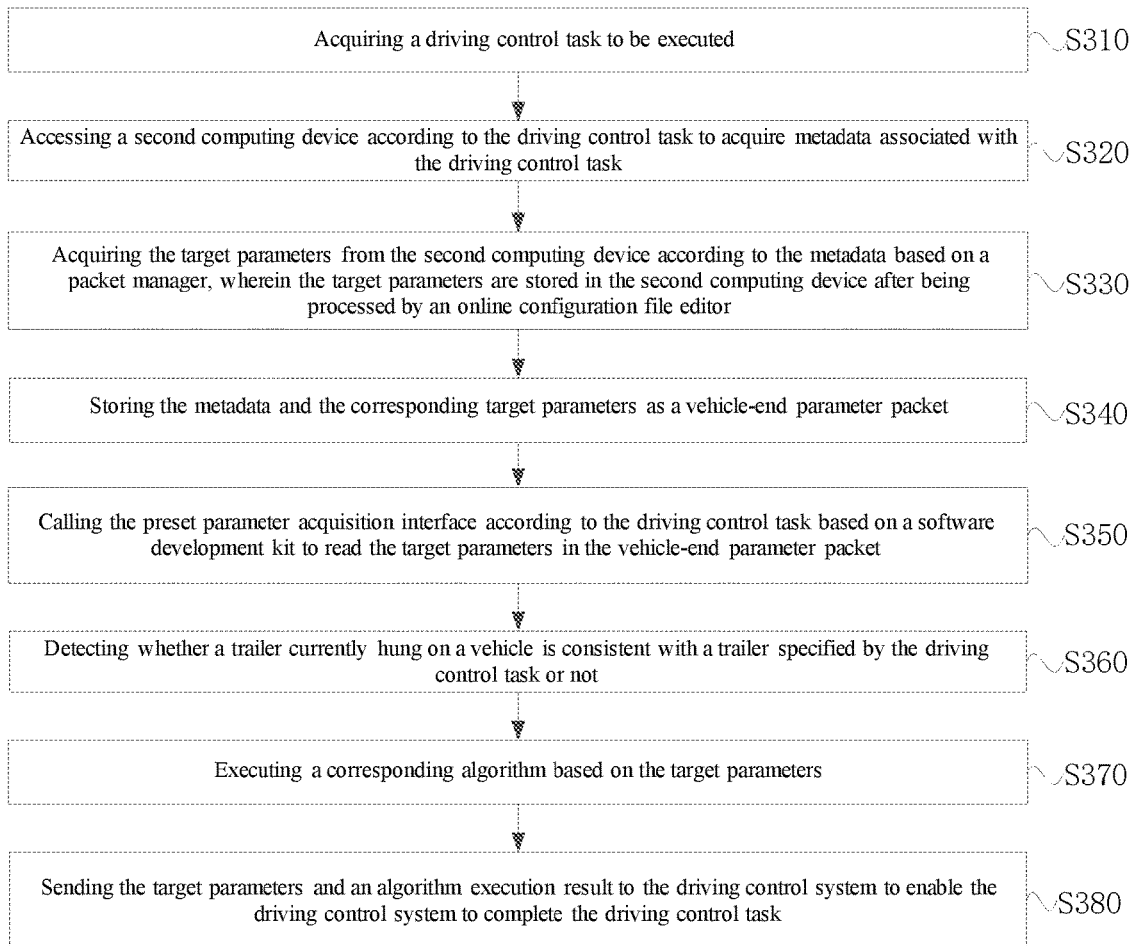
FIG. 4 is a flowchart of a vehicle control method provided in yet another embodiment of the present application.

FIG. 4 is a flowchart of a vehicle control method provided in yet another embodiment of the present application.

S310: a driving control task to be executed is acquired.

S320: a second computing device is accessed according to the driving control task to acquire metadata associated with the driving control task.

S330: the target parameters are acquired from the second computing device according to the metadata based on a packet manager, wherein the target parameters are stored in the second computing device after being processed by an online configuration file editor.

S340: the metadata and the corresponding target parameters are stored as a vehicle-end parameter packet.

S350: the preset parameter acquisition interface is called according to the driving control task based on a software development kit to read the target parameters in the vehicle-end parameter packet.

S360: whether a trailer currently mounted on a vehicle is consistent with a trailer specified by the driving control task or not is detected.

S370: a corresponding algorithm is executed based on the target parameters.

S380: the target parameters and an algorithm execution result are sent to the driving control system such that the driving control system can complete the driving control task.

In this embodiment, acquiring corresponding target parameters from the second computing device according to the metadata comprises: acquiring the target parameters from the second computing device according to the metadata based on a packet manager, wherein the target parameters are stored in the second computing device after being processed by an online configuration file editor.

Specifically, the target parameters are stored and downloaded by utilizing the packet manager which is a packet management system capable of distributing any configuration, data and software packets in the form of binary files. In some embodiments, the packet manager may be replaced with any packet management system, configuration management system or file storage system. Furthermore, the existing vehicle parameters can be edited, packaged and distributed through an online configuration file editor and stored in a second computing device in the form of a configuration packet, and a first computing device can acquire target parameters associated with a driving control task and corresponding to metadata from the second computing device based on a packet manager.

In this embodiment, calling a parameter acquisition interface to read the target parameters in the vehicle-end parameter packet comprises: calling the preset parameter acquisition interface according to the driving control task based on a software development kit (SDK) to read the target parameters in the vehicle-end parameter packet.

Specifically, the preset parameter acquisition interface is called through the SDK to read the target parameters stored in a vehicle-end parameter packet for a driving control task, the target parameters are used by the first computing device in an algorithm execution process according to requirements, and these target parameters and an algorithm execution result are provided for the driving control system according to requirements.

In this embodiment, a step prior to executing a corresponding algorithm based on the target parameters further comprises: detecting whether a trailer currently mounted on a vehicle is consistent with a trailer specified by the driving control task or not.

Specifically, for a vehicle with a tractor and trailer, such as a truck, whether a trailer currently mounted on the vehicle is consistent with a trailer specified by a driving control task or not needs to be detected before departure of the vehicle. For example, a trailer mounted on a vehicle #1 is a trailer #3, but in the following driving control task, a trailer #2 is required to be used by the vehicle #1. If the number of the currently-mounted trailer is detected to be inconsistent with the number of trailer specified by the driving control task, a tester can be prompted that the currently-mounted trailer may be incorrect and provided with at least two options including trailers #2 and #3, and the trailer specified by the driving control task can be selected by default, namely the trailer #2; the tester needs to confirm that the current selection (trailer #2) is correct, then acquires target parameters bound with the trailer and starts an unmanned driving mode.

Specifically, the trailer can be regarded as a connectable physical device. Different trailers are provided with a respective physical number, and whether a mounting or connecting signal exists or not is detected through a chip, a connecting wire, or another electronic connection when the trailers are mounted. A trailer number that is detected to be connected is sent to the first computing device, and the first computing device detects whether this trailer number is consistent with the trailer number specified by the driving control task or not. In some cases, the trailer may be uniquely bound with other devices, and the currently-mounted trailer number can be acquired by detecting other devices. For example, when a trailer is connected, a backward camera mounted on the trailer also needs to be connected, and in this case, whether the trailer currently mounted on the vehicle is consistent with the trailer specified by the driving control task or not can also be judged by detecting an identifier of the backward camera.

In this embodiment, a step prior to accessing a second computing device according to the driving control task further comprises: receiving a parameter configuration instruction generated by the driving control system according to the driving control task to trigger an execution of accessing the second computing device; a step after executing a corresponding algorithm based on the target parameters further comprises: sending the target parameters and an algorithm execution result to the driving control system such that the driving control system can complete the driving control task.

Specifically, the target parameters are used by the driving control system to control the vehicle, before which the driving control system sends the parameter configuration instruction to trigger the first computing device to access the second computing device to acquire the metadata and the target parameters from the second computing device.

The vehicle control method is described in detail below through specific examples.

The following events occur in a given sequence.

In the morning of day 1 of month X, a camera of a vehicle #1 is remounted, and calibration information of the camera relative to a vehicle position changes;

In the afternoon of day 1 of month X, the vehicle #1 is assigned a driving control task for day 2 of month X, and needs to mount a trailer #2 for departure, but at the moment, the vehicle is mounted with a trailer #3;

In the afternoon of day 1 of month X, a technician A updates the calibration information of the camera of the vehicle #1;

In the morning of day 2 of month X, a tester B pulls configurations of the vehicle #1 and the trailer #2 before departure of the vehicle;

In the morning of day 2 of month X, a driver C replaces the trailer #3 with the trailer #2 before departure of the vehicle;

In the morning of day 2 of month X, the driver C normally drives the vehicle for departure;

In the morning of day 2 of month X, the first computing device reads the target parameters in the vehicle-end parameter packet through the parameter acquisition interface, and accordingly controls the vehicle to complete the driving control task.

The above-mentioned process mainly comprises the following steps:

1) assigning the vehicle #1 the driving control task for day 2 of month X. In this process, driving control task data about the vehicle #1 on day 2 of month X are generated in a task management system, and various configuration information required by the driving control task is described and includes information of the trailer #2 required for mounting, wherein different vehicle models and different tasks may correspond to different configuration information. Metadata can be mapped to specific configuration information and stored such that complete configuration information does not need to be pulled during message delivery and some availability determination (e.g., whether the version is up-to-date). In addition, some default configuration information (metadata) for the driving control task can be provided in a task scheduling interface in the task management system, and part of the default configuration information is modified by task scheduling personnel according to an actual situation of a task on the day, so that the configuration information finally required by the task is formed.

2) updating, by the technician, the calibration information of the camera of the vehicle #1. In this step, the technician can edit the configuration through an online tool provided by the parameter management service, or can edit configuration files offline and upload them. After the technician updates the configuration, the parameter management service calls a check pipeline provided by the parameter check service to determine whether the updated parameters have a problem or not, and this part will check all the problems that can be checked out offline, for example, calibration configurations between multiple hardware that cannot be matched with each other, but cannot check the problems that cannot be checked out offline, such as, calibration parameters of an independent hardware having a slight error. After passing the parameter configuration check, the parameter management service stores the parameters in the parameter storage service and records information of the latest version of the parameters.

3) pulling, by the tester B, the configuration of the vehicle #1 before departure of the vehicle. The parameter pulling service determines which target parameters are to be pulled according to the driving control task, then the parameter pulling service acquires the latest version of metadata from the parameter management service according to the current vehicle (vehicle #1), acquires the corresponding version of target parameters through the vehicle storage service, and stores the target parameters in the local vehicle-end parameter packet.

4) acquiring, by the tester C, the configurations of the vehicle #1 and the trailer #2 corresponding to the driving control task before departure of the vehicle. However, at this time, since the vehicle #1 is mounted with the trailer #3 which is inconsistent with the trailer #2 specified by the driving control task, the parameter pull service can provide at least two options for the tester B, and prompt the tester B to decide whether to finally use the target parameters of the trailer #2 or the trailer #3. The target parameters of the trailer #2 specified by the driving control task can also be used by default. For other target parameters except the target parameters bound with the trailers, if the target parameters specified by the driving control task are not in accordance with the current actual condition, a similar mode can be adopted, namely related personnel are prompted to select the target parameters, or the target parameters specified by the driving control task are selected by default.

5) replacing, by the driver C, the trailer followed by normal departure of the vehicle, and starting the driving control system. It should be noted that, if the trailer actually mounted by the vehicle is inconsistent with the trailer in the target parameters when the driving control system is started, prompt information indicating that the trailer is not correctly mounted is given, and the driving control system can be normally started after related personnel confirm that the trailer is correctly mounted on the vehicle.

6) reading, by the algorithm execution module, the target parameters through the parameter acquisition interface and executing a corresponding algorithm, and providing the target parameters and an execution result for the driving control system to control the vehicle. The algorithm execution module calls the preset uniform parameter acquisition interface through the SDK to read specific parameters with different configurations such as a vehicle and a trailer stored in the vehicle-end parameter packet, and uses the parameters in a specific algorithm according to the requirements.

The vehicle control method of this embodiment solves the problems of parameter management, storage and maintenance of the unmanned vehicle, can ensure the correctness of unmanned parameter configuration, ensures the validity and the updating timeliness of vehicle parameters for different driving control tasks, and provides reliable guarantee for the safety of driving control.

Figure 5:
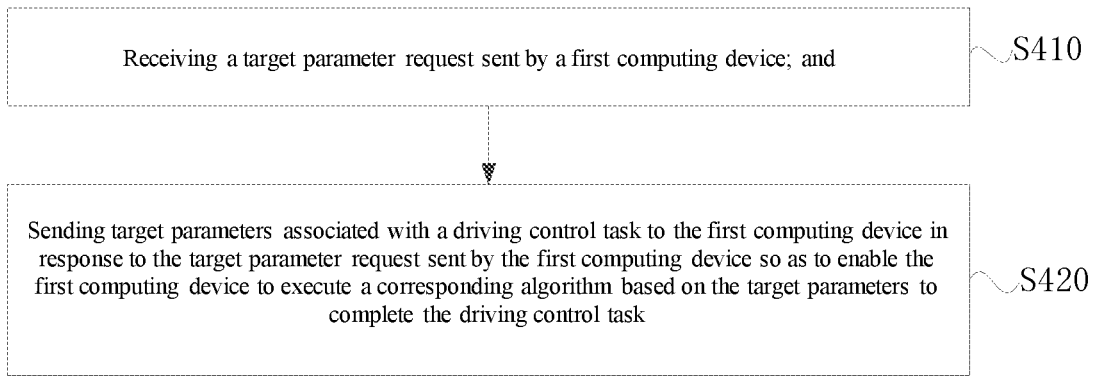
FIG. 5 is a flowchart of a task processing method provided in an embodiment of the present application.

An embodiment of the present application further provides a task processing method. FIG. 5 is a flowchart of a task processing method provided in an embodiment of the present application. It should be noted that, technical details that are not described in detail in this embodiment can be seen from any of the embodiments described above.

As shown in FIG. 5, the method provided in this embodiment comprises:

S410: receiving a target parameter request sent by a first computing device.

S420: sending target parameters associated with a driving control task to the first computing device in response to the target parameter request sent by the first computing device so as to enable the first computing device to execute a corresponding algorithm based on the target parameters such that a driving control task can complete the driving control task.

In this embodiment, the target parameter request comprises a driving control task, and can be sent to the parameter storage service of the second computing device by the parameter pulling service of the first computing device. The second computing device sends target parameters associated with the driving control task to enable the first computing device to automatically execute a corresponding algorithm so as to provide a reliable basis for a driving control system to complete a driving control task.

Figure 6:
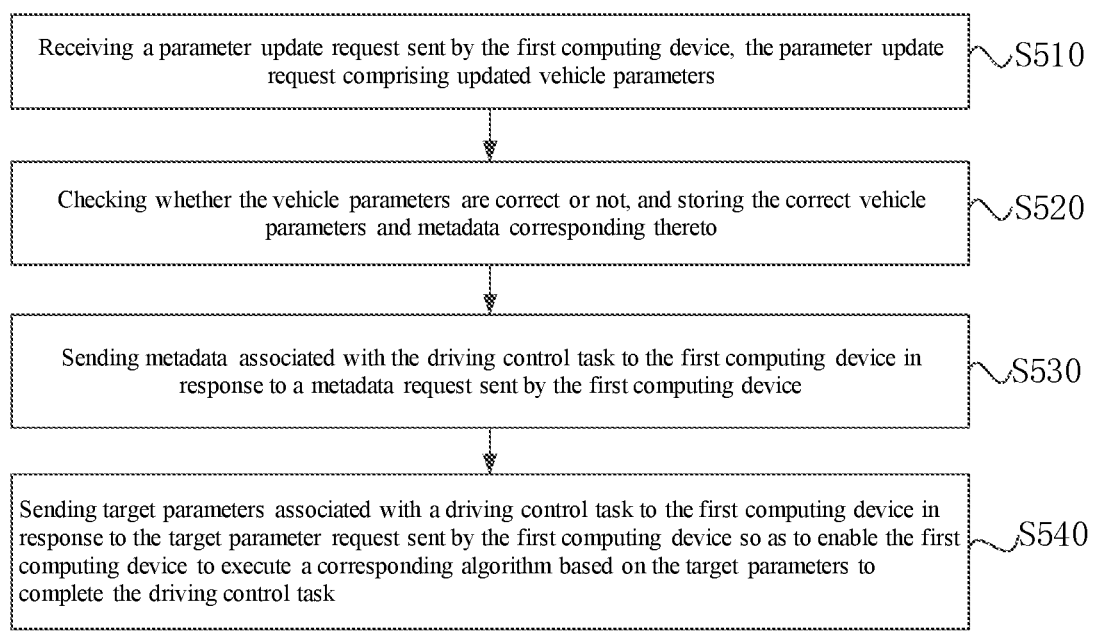
FIG. 6 is a flowchart of a task processing method provided in another embodiment of the present application.

FIG. 6 is a flowchart of a task processing method provided in another embodiment of the present application. As shown in FIG. 6, in this embodiment, the method further comprises: receiving a parameter update request sent by the first computing device, the parameter update request comprising updated vehicle parameters; and checking whether the vehicle parameters are correct or not, and storing the correct vehicle parameters and metadata corresponding thereto.

In this embodiment, the first computing device can send a parameter update request to the second computing device periodically, or send a parameter update request to the second computing device when it is detected that software and hardware information of the vehicle changes. The second computing device collects the latest vehicle parameters according to the parameter update request and checks whether the vehicle parameters are correct or not, and the vehicle parameters passing the checking can be stored in the parameter storage service of the second computing device.

S510: a parameter update request sent by the first computing device is received, the parameter update request comprising updated vehicle parameters.

S520: whether the vehicle parameters are correct or not is determined, and the correct vehicle parameters and metadata corresponding thereto are stored.

Specifically, the vehicle parameters can be checked through a preset script and a check rule.

In an embodiment, determining whether the vehicle parameters are correct or not comprises at least one of:

1) determining whether upper limit and lower limit of the vehicle parameters belong to a preset range or not, wherein for example, whether the highest sensitivity and the lowest sensitivity of sensors belong to the preset range or not is checked, so that the flexibility and the safety of driving control are prevented from being influenced by overhigh or overlow sensitivity of the sensors, and for another example, whether positions of the sensors are in an expected position or not is checked;

2) determining whether a mathematical operation result of the vehicle parameters belongs to a preset set, for example, determining whether a trailer required for completing a driving control task in a specific driving scene is one of standby trailers or not, or whether the number of required sensors is less than or equal to the total number of sensors set by the vehicle;

3) determining whether an output obtained by substituting the vehicle parameters into a preset code for running meets a preset condition or not, for example, determining whether software and a socket of a server can realize normal running and data communication of the software or not in the case of using a vehicle-end server configured correspondingly; or 4) submitting the vehicle parameters to the parameter storage service after being checked correctly, maintaining metadata of the vehicle parameters by the parameter management service, and sending metadata associated with the driving control task to the first computing device through the parameter management service or sending target parameters associated with the driving control task to the first computing device through the parameter storage service when the second computing device receives a metadata request or a target parameter request from the first computing device.

S530: metadata associated with the driving control task is sent to the first computing device in response to a metadata request sent by the first computing device, the metadata corresponding to the target parameters.

S540: target parameters associated with a driving control task is sent to the first computing device in response to the target parameter request sent by the first computing device so as to enable the first computing device to execute a corresponding algorithm based on the target parameters such that a driving control task can complete the driving control task.

In this embodiment, before the target parameters are acquired, the parameter pulling service of the first computing device can further acquire the metadata associated with the driving control task from the parameter management service of the second computing device, and then the parameter pulling service acquires the corresponding target parameters according to the metadata, so that the target parameters can be maintained, updated and expanded conveniently.

Figure 7:
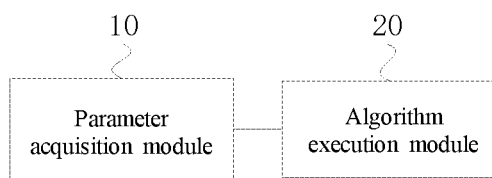
FIG. 7 is a schematic diagram of a structure of a vehicle control apparatus provided in an embodiment of the present application.

An embodiment of the present application further provides a vehicle control apparatus. FIG. 7 is a schematic diagram of a structure of a vehicle control apparatus provided in an embodiment of the present application. As shown in FIG. 7, the vehicle control apparatus comprises: a parameter acquisition module 10 and an algorithm execution module 20.

The parameter acquisition module 10 is configured for acquiring a driving control task to be executed and target parameters associated with the driving control task.

The algorithm execution module 20 is configured for executing a corresponding algorithm based on the target parameters such that a driving control system can complete the driving control task.

The vehicle control apparatus of this embodiment provides a reliable basis for the driving control system to complete the driving control task by acquiring target parameters associated with the driving control task and automatically executing a corresponding algorithm.

In an embodiment, the vehicle control apparatus resides in a first computing device, wherein the parameter acquisition module 10 comprises:

a metadata acquisition unit, configured for accessing a second computing device according to the driving control task to acquire metadata associated with the driving control task; and a target parameter acquisition unit, configured for acquiring corresponding target parameters according to the metadata.

In an embodiment, the vehicle control apparatus further comprises:

a storage module, configured for storing the metadata and the corresponding target parameters as a vehicle-end parameter packet after acquiring the corresponding target parameters according to the metadata; and a calling module, configured for calling a parameter acquisition interface to read the target parameters in the vehicle-end parameter packet.

In an embodiment, the target parameter acquisition unit is configured for: judging whether local metadata associated with the driving control task is stored at a vehicle; if yes, acquiring the target parameters corresponding to the metadata from the second computing device when the metadata is updated relative to the local metadata stored at the vehicle.

In an embodiment, the target parameter acquisition unit is further configured for: adopting target parameters in a vehicle-end parameter packet corresponding to the local metadata stored locally when the metadata is not updated relative to the local metadata stored at the vehicle.

In an embodiment, the driving control task comprises at least one of the following: a driving starting point, a driving ending point, a driving scene, a vehicle number or a trailer number.

In an embodiment, target parameters are further associated with parameter change information of a vehicle, wherein the parameter change information includes at least one of the following: vehicle model information, trailer information, a pairing relationship between the vehicle model information and the trailer information, sensor information or vehicle-end server configuration.

In an embodiment, target parameters comprise at least one of the following: a vehicle size, a vehicle model, hardware layout and calibration information; a trailer identifier, a trailer size, sensor information mounted on a trailer; a type, number, setting position and angle of sensors; parameters of an algorithm model bound with a driving control task; or configuration parameters of a corresponding relationship between software of a vehicle-end service and software allocation resources.

In an embodiment, the metadata comprises at least one of the following: an index of a parameter set to which the target parameters belong; a creation time and an update time of the target parameters; historical version information of the target parameters and an index of each historical version; a creator and an updater for the target parameters; or updated description information of the target parameters.

In an embodiment, the vehicle control apparatus further comprises: a first selection module configured for selecting configuration parameters bound with the vehicle model information as target parameters according to configuration files of the vehicle-end service.

In an embodiment, the vehicle control apparatus further comprises: a second selection module configured for selecting configuration parameters bound with the trailer information as target parameters according to test operation and maintenance data of a driving control task in a set time period.

In an embodiment, the target parameter acquisition unit is configured for: acquiring the target parameters from the second computing device according to the metadata based on a packet manager, wherein the target parameters are stored in the second computing device after being processed by an online configuration file editor.

In an embodiment, the calling module is configured for: calling the preset parameter acquisition interface according to the driving control task based on a software development kit to read the target parameters in the vehicle-end parameter packet.

In an embodiment, the vehicle control apparatus further comprises: a detecting module configured for detecting whether a trailer currently mounted on a vehicle is consistent with a trailer specified by the driving control task or not prior to executing a corresponding algorithm based on the target parameters.

In an embodiment, the vehicle control apparatus further comprises:
a triggering module configured for receiving a parameter configuration instruction generated by the driving control system according to the driving control task to trigger and execute an operation of accessing the second computing device prior to accessing a second computing device according to the driving control task; and
a sending module configured for sending the target parameters and an algorithm execution result to the driving control system such that the driving control system can complete the driving control task after executing a corresponding algorithm based on the target parameters.

Technical details that are not described in detail in embodiments of the vehicle control apparatus can be seen from any of the embodiments described above, and embodiments of the vehicle control apparatus can have similar beneficial effects those described with respect to the vehicle control method implemented in the above-mentioned embodiments.

Figure 8:
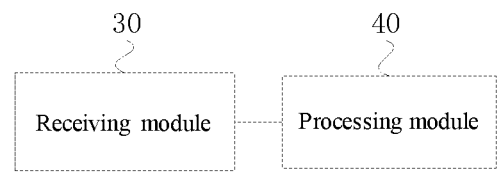
FIG. 8 is a schematic diagram of a structure of a task processing apparatus provided in an embodiment of the present application.

An embodiment of the present application further provides a task processing apparatus. FIG. 8 is a schematic diagram of a structure of a task processing apparatus provided in an embodiment of the present application. As shown in FIG. 8, the task processing apparatus comprises: a receiving module 30 and a processing module 40.

The receiving module 30 is configured for receiving a target parameter request sent by a first computing device.

The processing module 40 is configured for sending target parameters associated with a driving control task to the first computing device in response to the target parameter request sent by the first computing device so as to enable the first computing device to execute a corresponding algorithm based on the target parameters such that a driving control task can complete the driving control task.

The task processing apparatus of this embodiment sends the target parameters associated with the driving control task to the first computing device to automatically execute the corresponding algorithm, so that a reliable basis is provided for the driving control system to complete the driving control task.

In an embodiment, the task processing apparatus further comprises: a metadata response module configured for sending metadata associated with the driving control task to the first computing device in response to a metadata request sent by the first computing device, the metadata corresponding to the target parameters.

In an embodiment, the task processing apparatus further comprises:
an updating module configured for receiving a parameter update request sent by the first computing device, the parameter update request comprising updated vehicle parameters; and
a checking module configured for checking whether the vehicle parameters are correct or not, and storing the correct vehicle parameters and metadata corresponding thereto.

In an embodiment, the checking module is configured for at least one of the following: determining whether upper limit and lower limit of the vehicle parameter belong to a preset range or not; determining whether a mathematical operation result of the vehicle parameters belongs to a preset set or not; or determining whether an output obtained by substituting the vehicle parameters into a preset code for running meets a preset condition or not.

Technical details that are not described in detail in embodiments of the task processing apparatus can be seen from any of the embodiments described above, and embodiments of the task processing apparatus can have similar beneficial effects as those described with respect to the task processing method implemented in the above-mentioned embodiments.

Figure 9:
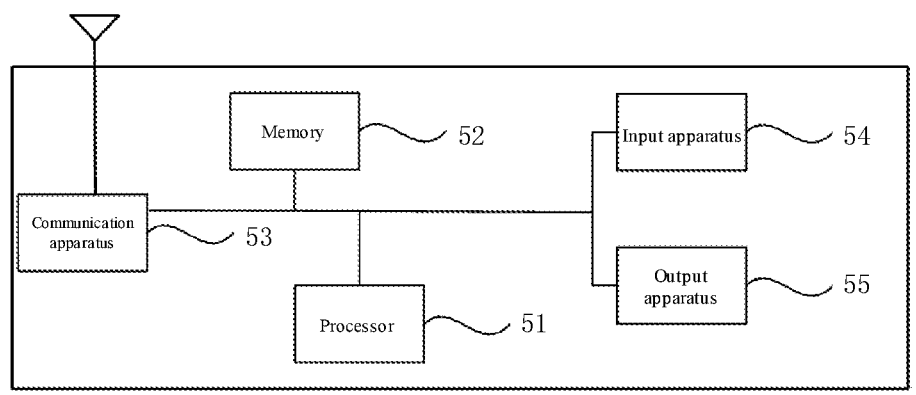
FIG. 9 is a schematic diagram of a hardware structure of a first computing device provided in an embodiment of the present application.

An embodiment of the present application further provides a first computing device. FIG. 9 is a schematic diagram of a hardware structure of a first computing device provided in an embodiment of the present application. As shown in FIG. 9, the first computing device provided in the present application comprises a memory 52, a processor 51, and a computer program stored on the memory and capable of running on the processor, and when the processor 51 executes the program, the above-mentioned vehicle control method can be implemented.

The first computing device may further comprise the memory 52; the number of the processor 51 of the first computing device may be one or more, and one processor 51 is taken as an example in FIG. 9; the memory 52 is used for storing one or more programs, wherein the one or more programs, when executed by the one or more processors 51, cause the one or more processors 51 to implement the vehicle control method in the embodiment of the present invention.

The first computing device further comprises: a communication apparatus 53, an input apparatus 54 and an output apparatus 55.

The processor 51, the memory 52, the communication apparatus 53, the input apparatus 54 and the output apparatus 55 in the first computing device can be connected by a bus or other manners, and a connection via a bus is taken as an example in FIG. 9.

The input apparatus 54 can be used for receiving input numeric or character information and generating key signal inputs associated with user settings and function controls of the first computing device. The output apparatus 55 may comprise a display device such as a display screen.

The communication apparatus 53 may comprise a receiver and a transmitter. The communication apparatus 53 is configured for performing information receiving and sending and communication according to the controls of the processor 51.

The memory 52, which is a computer-readable storage medium, can be configured for storing software programs, computer-executable programs and modules, such as program instructions/modules (e.g., the parameter acquisition module 10 and the algorithm execution module 20 in the vehicle control apparatus) corresponding to the vehicle control method according to the embodiment of the present application. The memory 52 may comprise a storage program area and a storage data area, wherein the storage program area can store an operating system, an application program required for at least one function; the storage data area can store data created from use of the first computing device, and the like. Furthermore, the memory 52 may comprise a high speed random access memory, and may further comprise a non-volatile memory, such as at least one magnetic disk memory, flash memory, or other non-volatile solid state memory. In some examples, the memory 52 may further comprise memories disposed remotely from the processor 51 and capable of being connected to the first computing device via a network. Examples of the above network include, but are not limited to, the Internet, intranets, local area networks, mobile communication networks, and combinations thereof.

Figure 10:
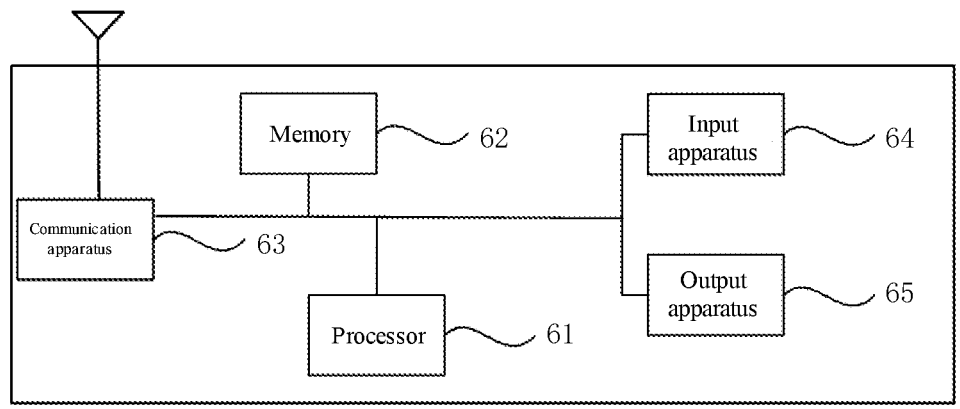
FIG. 10 is a schematic diagram of a hardware structure of a second computing device provided in an embodiment of the present application.

An embodiment of the present application further provides a second computing device; FIG. 10 is a schematic diagram of a hardware structure of a second computing device provided in an embodiment of the present application, and as shown in FIG. 10, the second computing device provided in the present application comprises a memory 62, a processor 61, and a computer program stored on the memory and capable of running on the processor, and when the processor 61 executes the program, the above-mentioned task processing method can be implemented.

The second computing device may further comprise the memory 62; the number of the processor 61 of the second computing device may be one or more, and one processor 61 is taken as an example in FIG. 10; the memory 62 is used for storing one or more programs, wherein the one or more programs, when executed by the one or more processors 61, cause the one or more processors 61 to implement the task processing method in the embodiment of the present invention.

The second computing device further comprises: a communication apparatus 63, an input apparatus 64 and an output apparatus 65.

The processor 61, the memory 62, the communication apparatus 63, the input apparatus 64 and the output apparatus 65 in the second computing device can be connected by a bus or other manners, and a connection via a bus is taken as an example in FIG. 10.

The input apparatus 64 can be used for receiving input numeric or character information and generating key signal inputs associated with user settings and function controls of the second computing device. The output apparatus 65 may comprise a display device such as a display screen.

The communication apparatus 63 may comprise a receiver and a transmitter. The communication apparatus 63 is configured for performing information receiving and sending and communication according to the controls of the processor 61.

The memory 62, which is a computer-readable storage medium, can be configured for storing software programs, computer-executable programs and modules, such as program instructions/modules (e.g., the receiving module 30 and the processing module 40 in the task processing apparatus) corresponding to the task processing method according to the embodiment of the present invention. The memory 62 may comprise a storage program area and a storage data area, wherein the storage program area can store an operating system, an application program required for at least one function; the storage data area can store data created from use of the second computing device, and the like. Furthermore, the memory 62 may comprise a high speed random access memory, and may further comprise a non-volatile memory, such as at least one magnetic disk memory, flash memory, or other non-volatile solid state memory. In some examples, the memory 62 may further comprise memories disposed remotely from the processor 61 and capable of being connected to the first computing device via a network. Examples of the above network include, but are not limited to, the Internet, intranets, local area networks, mobile communication networks, and combinations thereof.

Figure 11:
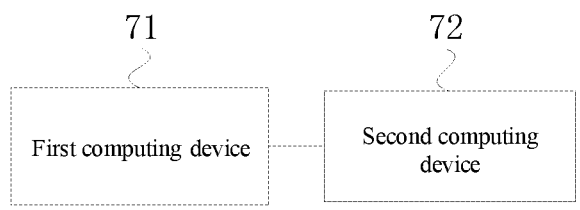
FIG. 11 is a schematic diagram of a structure of a vehicle control system provided in an embodiment of the present application.

FIG. 11 is a schematic diagram of a structure of a vehicle control system provided in an embodiment of the present application. An embodiment of the present application further provides a vehicle control system, which comprises a first computing device 71 and a second computing device 72, wherein the first computing device 71 and the second computing device 72 are connected by a network; the second computing device 72 is used for managing target parameters associated with a driving control task and metadata corresponding to the target parameters; the first computing device 71 is used for acquiring the target parameters and controlling a vehicle according to the target parameters.

In this embodiment, the first computing device 71 can be used for implementing the vehicle control method in any of the embodiments described above. The second computing device 72 can be used for implementing the task processing method in any of the embodiments described above.

In an embodiment, acquiring, by the first computing device 71, target parameters associated with the driving control task specifically comprises: accessing, by the first computing device 71, a second computing device 72 according to the driving control task to acquire metadata associated with the driving control task; and acquiring corresponding target parameters according to the metadata.

In an embodiment, the first computing device 71 further stores the metadata and the corresponding target parameters as a vehicle-end parameter packet and calls a parameter acquisition interface to read the target parameters in the vehicle-end parameter packet after acquiring the corresponding target parameters according to the metadata.

In an embodiment, acquiring, by the first computing device 71, corresponding target parameters according to the metadata comprises: judging, by the first computing device 71, whether local metadata associated with the driving control task is stored at the vehicle; if yes, acquiring the target parameters corresponding to the metadata from the second computing device 72 when the metadata is updated relative to the local metadata stored at the vehicle.

In an embodiment, the first computing device 71 adopts target parameters in a vehicle-end parameter packet corresponding to the local metadata stored locally when the metadata is not updated relative to the local metadata stored at the vehicle.

In an embodiment, the method further comprises: selecting, by the first computing device 71, configuration parameters bound with the vehicle model information as target parameters according to configuration files of the vehicle-end service.

In an embodiment, the method further comprises: selecting, by the first computing device 71, configuration parameters bound with the trailer information as target parameters according to test operation and maintenance data of a driving control task in a set time period.

In an embodiment, acquiring, by the first computing device 71, corresponding target parameters from the second computing device according to the metadata comprises: acquiring, by the first computing device 71, the target parameters from the second computing device according to the metadata based on a packet manager, wherein the target parameters are stored in the second computing device after being processed by an online configuration file editor.

In an embodiment, calling, by the first computing device 71, a parameter acquisition interface to read the target parameters in the vehicle-end parameter packet comprises: calling, by the first computing device 71, the preset parameter acquisition interface according to the driving control task based on a software development kit to read the target parameters in the vehicle-end parameter packet.

In an embodiment, the first computing device 71 further detects whether a trailer currently mounted on a vehicle is consistent with a trailer specified by the driving control task or not prior to executing a corresponding algorithm based on the target parameters.

In an embodiment, the first computing device 71 further receives a parameter configuration instruction generated by the driving control system according to the driving control task to trigger and execute an operation of accessing the second computing device prior to accessing a second computing device according to the driving control task.

The first computing device 71 further sends the target parameters and an algorithm execution result to the driving control system such that the driving control system can complete the driving control task after executing a corresponding algorithm based on the target parameters.

In an embodiment, the second computing device 72 receives the target parameter request sent by the first computing device 71, and sends target parameters associated with a driving control task to the first computing device 71 in response to the target parameter request sent by the first computing device 71 so as to enable the first computing device 71 to execute a corresponding algorithm based on the target parameters such that a driving control task can complete the driving control task.

In an embodiment, the second computing device 72 further sends metadata associated with the driving control task to the first computing device 71 in response to a metadata request sent by the first computing device 71, the metadata corresponding to the target parameters.

In an embodiment, the second computing device 72 further receives a parameter update request sent by the first computing device, the parameter update request comprising updated vehicle parameters, checks whether the vehicle parameters are correct or not, and stores the correct vehicle parameters and metadata corresponding thereto.

An embodiment of the present application further provide a storage medium having a computer program stored thereon, wherein the computer program is executed by a processor to implement the vehicle control method or the task processing method in any of the embodiments of the present application.

The computer storage medium of the embodiment of the present application can adopt any combination of one or more computer-readable media. The computer-readable medium can be a computer-readable signal medium or a computer-readable storage medium. The computer-readable storage medium can be, for example, but is not limited to: an electronic, magnetic, optical, electromagnetic, infrared or semiconductor system, apparatus or device, or any combination of the above. More specific examples (a non-exhaustive list) of the computer-readable storage medium comprise: an electrical connection having one or more wires, a portable computer diskette, a hard disk, a random access memory (RAM), a read-only memory (ROM), an erasable programmable read only memory (EPROM), a flash memory, an optical fiber, a portable CD-ROM, an optical storage device, a magnetic storage device, or any suitable combination of the above. The computer-readable storage medium can be any tangible medium containing or storing a program capable of being used by or in connection with an instruction execution system, apparatus or device.

The computer-readable signal medium may comprise a propagated data signal in a baseband or as part of a carrier wave having computer-readable program codes embodied therein. Such a propagated data signal may take a variety of forms including, but not limited to: an electromagnetic signal, an optical signal, or any suitable combination of the above. The computer-readable signal medium can also be any computer-readable medium other than a computer-readable storage medium and that can send, propagate or transmit a program used by or in connection with an instruction execution system, apparatus or device.

The program codes embodied in the computer-readable medium can be transmitted using any appropriate medium including, but not limited to: wireless medium, wire, optical cable, radio frequency (RF), etc., or any suitable combination of the above.

The computer program codes for executing operations of the present application can be written by one or more programming languages or a combination thereof, wherein the programming languages include an object-oriented programming language, such as Java, Smalltalk, or C++, or a conventional procedural programming language, such as "C" programming language or similar programming languages. The program codes can be executed entirely on a user's computer, partly on a user's computer, as a separate software packet, partly on a user's computer and partly on a remote computer, or entirely on a remote computer or a server. In the case of executing on a remote computer, the remote computer can be connected to a user's computer through any type of network including a local area network (LAN) or a wide area network (WAN), or can be connected to an external computer (for example, through the Internet using an Internet service provider).

The above description is only exemplary embodiments of the present application, and is not intended to limit the protection scope of the present application. It will be clear to those skilled in the art that a term user terminal covers any suitable type of wireless user devices, such as a mobile phone, a portable data processing apparatus, a portable web browser or a vehicle-mounted mobile station.

In general, the various embodiments of the present application can be implemented in hardware or application-specific circuits, software, logic or any combination thereof. For example, some aspects can be implemented in hardware, while other aspects can be implemented in firmware or software which can be executed by a controller, a microprocessor or other computing apparatus, although the present application is not limited thereto.

The embodiment of the present application can be implemented by a data processor of a mobile apparatus executing a computer program instruction, for example in a processor entity, or by hardware, or by a combination of software and hardware. The computer program instruction can be an assembler instruction, an instruction set architecture (ISA) instruction, a machine-related instruction, a microcode, a firmware instruction, state setting data, or a source code or a target code written in any combination of one or more programming languages.

The block diagrams of logic flows in the figures of the present application may represent program steps, or may represent interconnected logic circuits, modules and functions, or may represent a combination of program steps and logic circuits, modules and functions. Computer programs can be stored on a memory. The memory can be of any type suitable to a local technical environment and can be implemented using any suitable data storage technology, for example, but not limited to, a read-only memory (ROM), a random access memory (RAM), or an optical storage apparatus and system (such as a digital video disc (DVD), or a compact disk (CD)). The computer-readable medium may comprise a non-transitory storage medium. The data processor can be of any type suitable to a local technical environment, for example, but not limited to: a general purpose computer, a special purpose computer, a microprocessor, a digital signal processor (DSP), an application-specific integrated circuit (ASIC), a programmable logic device (FGPA), and a processor based on a multi-core processor architecture.

The detailed description of the exemplary embodiments of the present application are provided above through exemplary and non-limiting examples. However, various modifications and adjustments to the above-mentioned embodiments may become apparent to those skilled in the art in view of the accompanying drawings and claims, without departing from the scope of the present application. Accordingly, the proper scope of the present application is determined according to the claims.

What is claimed is:

1. A vehicle control method, comprising:
   acquiring, by a first computing device communicatively coupled to a driving control system in a vehicle, a driving control task to be executed;
   acquiring, by the first computing device, target parameters associated with the driving control task; and
   executing a corresponding algorithm by the first computing device based on the target parameters to cause the driving control system to complete the driving control task;
   wherein acquiring target parameters associated with the driving control task comprises: receiving, from a second computing device, metadata associated with the driving control task; determining whether the metadata received from the second computing device has been updated relative to metadata stored in the first computing device, wherein the target parameters are further associated with parameter change information of the vehicle, and the parameter change information comprises a pairing relationship between vehicle model information and trailer information; and
   acquiring the target parameters according to the metadata received from the second computing device in response to determining the metadata acquired from the second computing device has been updated relative to the metadata stored in the first computing device, comprising:
      acquiring, in response to determining the corresponding metadata acquired from the second computing device has been updated relative to the metadata stored in the first computing device, configuration parameters of a corresponding relationship between software of a vehicle-end service and allocation resources of the software.

2. The method according to claim 1, wherein acquiring the target parameters according to the metadata further comprises:
   acquiring the target parameters from a vehicle-end parameter packet according to the metadata stored the first computing device or received from the second computing device in response to determining the metadata received from the second computing device has not been updated relative to the metadata stored in the first computing device.

3. The method according to claim 1, wherein acquiring the target parameters according to the metadata from the second computing device comprises:
   acquiring the target parameters according to the metadata from the second computing device based on a packet manager, wherein the target parameters are stored in the second computing device after being processed by an online configuration file editor.

4. The method according to claim 1, further comprises:
detecting whether a trailer currently mounted on a vehicle is consistent with a trailer specified by the driving control task or not according to a trailer identifier or a sensor identifier of a sensor mounted on the trailer.

5. The method according to claim 1, wherein the metadata comprises at least one of:
an index of a parameter set to which the target parameters belong;
a creation time and an update time of the target parameters;
historical version information of the target parameters and an index of each historical version;
a creator and an updater for the target parameters; or
updated description information of the target parameters.

6. The method according to claim 1, further comprises:
calling a parameter acquisition interface to read the target parameters in a vehicle-end parameter packet by:
calling the parameter acquisition interface according to the driving control task based on a software development kit to read the target parameters in the vehicle-end parameter packet.

7. The method according to claim 1, wherein:
before accessing the second computing device according to the driving control task, the method further comprises:
receiving a parameter configuration instruction generated by the driving control system according to the driving control task to trigger an execution of accessing the second computing device; and
after executing the corresponding algorithm based on the target parameters, the method further comprises:
sending the target parameters and an algorithm execution result to the driving control system to enable the driving control system to complete the driving control task.

8. The method according to claim 1, wherein:
the driving control task comprises at least one of: a driving starting point, a driving ending point, a driving scene, a vehicle number or a trailer number;
the parameter change information further comprises at least one of: vehicle model information, trailer information, sensor information or vehicle-end server configuration.

9. The method according to claim 8, wherein the target parameters comprise configuration parameters of a corresponding relationship between software of a vehicle-end service and software allocation resources, and the method further comprising:
selecting configuration parameters bound with the vehicle model information as target parameters according to configuration files of the vehicle-end service.

10. The method according to claim 8, further comprising:
selecting configuration parameters bound with the trailer information as target parameters according to test operation and maintenance data of a driving control task in a set time period.

11. The method according to claim 1, wherein the target parameters comprise
a set including a trailer identifier, a trailer size, and sensor information mounted on a trailer.

12. A task processing method, comprising:
receiving, at a second computing device, a metadata request from a first computing device;
sending metadata associated with a driving control task to the first computing device in response to metadata request;
receiving a target parameter request from a first computing device in response to the first computing device determining that the metadata received from the second computing device has been updated relative to metadata stored in the first computing device; and
sending target parameters associated with a driving control task of a vehicle to the first computing device in response to the target parameter request so as to enable the first computing device to execute a corresponding algorithm based on the target parameters to complete the driving control task, comprising:
sending configuration parameters of a corresponding relationship between software of a vehicle-end service and allocation resources of the software in response to the target parameter request;
wherein the target parameters are associated with parameter change information of the vehicle, and the parameter change information comprises a pairing relationship between vehicle model information and trailer information.

13. The method according to claim 12, further comprising:
receiving a parameter update request from the first computing device, the parameter update request comprising updated vehicle parameters;
determining whether the vehicle parameters are correct or not; and
storing the vehicle parameters and metadata corresponding thereto, in response to the vehicle parameters are correct.

14. The method according to claim 13, wherein determining whether the vehicle parameters are correct or not comprises at least one of:
determining whether upper limit and lower limit of the vehicle parameters belong to a preset range or not;
determining whether a mathematical operation result of the vehicle parameters belongs to a preset set or not; or
determining whether an output obtained by substituting the vehicle parameters into a preset code for running meets a preset condition or not;
wherein determining whether a mathematical operation result of the vehicle parameters belongs to a preset set or not comprises:
determining whether a number of sensors required for completing a driving control task is less than or equal to a total number of sensors mounted on the vehicle.

15. A first computing device, comprising:
one or more processors; and
a memory storing instructions; wherein
the instructions, when executed by the one or more processors, cause the one or more processors to implement a vehicle control method comprising:
acquiring a driving control task to be executed;
acquiring target parameters associated with the driving control task; and
executing a corresponding algorithm based on the target parameters to enable a driving control system to complete the driving control task;
wherein acquiring target parameters associated with the driving control task comprises: receiving, from a second computing device, metadata associated with the driving control task; determining whether the metadata received from the second computing device has been updated relative to metadata stored in the first computing device; and
acquiring the target parameters according to the metadata received from the second computing device in response to determining the metadata acquired from the second computing device has been updated relative to the metadata stored in the first computing device, comprising:
acquiring, in response to determining the corresponding metadata acquired from the second computing device has been updated relative to the metadata stored in the first computing device, configuration parameters of a corresponding relationship between software of a vehicle-end service and allocation resources of the software.

16. The first computing device according to claim 15, wherein the vehicle control method further comprises:
accessing a second computing device according to the driving control task to acquire metadata associated with the driving control task;
acquiring the target parameters according to the metadata; and
storing the metadata and the target parameters as a vehicle-end parameter packet.

17. The first computing device according to claim 15, wherein:
the instructions, when executed by the one or more processors, further cause the one or more processors to implement a task processing method comprising:
receiving a target parameter request from a first computing device; and
sending target parameters associated with a driving control task to the first computing device in response to the target parameter request so as to enable the first computing device to execute a corresponding algorithm based on the target parameters to complete the driving control task.

18. The method according to claim 1, wherein acquiring the target parameters according to the metadata received from the second computing device in response to determining the metadata acquired from the second computing device has been updated relative to the metadata stored in the first computing device comprises:
acquiring a first set including parameters of an algorithm model bound with a driving control task in response to determining the corresponding metadata acquired from the second computing device has been updated relative to the metadata stored in the first computing device;
wherein the parameters of the algorithm model comprise at least one of model type or model parameters, the algorithm model comprises at least one of a positioning algorithm, a perception algorithm, a decision algorithm, a control algorithm, a road condition analysis algorithm, a path planning algorithm or an obstacle avoidance algorithm.

19. The method according to claim 1, wherein acquiring the target parameters according to the metadata received from the second computing device in response to determining the metadata acquired from the second computing device has been updated relative to the metadata stored in the first computing device comprises:
acquiring a second set including a vehicle size, a vehicle model, hardware layout and calibration information in response to determining the corresponding metadata acquired from the second computing device has been updated relative to the metadata stored in the first computing device.

20. The method according to claim 1, wherein acquiring the target parameters according to the metadata received from the second computing device in response to determining the metadata acquired from the second computing device has been updated relative to the metadata stored in the first computing device comprises:
acquiring a third set including a type, number, setting position and angle of sensors in response to determining the corresponding metadata acquired from the second computing device has been updated relative to the metadata stored in the first computing device.

* * * * *